(12) United States Patent
Reutemann

(10) Patent No.: US 6,371,631 B1
(45) Date of Patent: Apr. 16, 2002

(54) RADIATION SOURCE FOR IRRADIATING THE INNER WALLS OF LONG HOLLOW CAVITIES

(75) Inventor: Thomas Reutemann, Sonthofen (DE)

(73) Assignee: UV Reline.Tec GmbH & Co., Kempten (DE)

(*) Notice: Subject to any disclaimer, the term of this patent is extended or adjusted under 35 U.S.C. 154(b) by 0 days.

(21) Appl. No.: 09/743,655
(22) PCT Filed: Jun. 17, 1999
(86) PCT No.: PCT/EP99/04211
§ 371 Date: Jan. 12, 2001
§ 102(e) Date: Jan. 12, 2001
(87) PCT Pub. No.: WO00/03863
PCT Pub. Date: Jan. 27, 2000

(30) Foreign Application Priority Data

Jul. 18, 1998 (DE) .................................. 298 12 835 U

(51) Int. Cl.[7] .............................................. F21V 21/14
(52) U.S. Cl. ..................... 362/390; 362/369; 362/234; 362/264; 362/238; 362/250; 138/97; 34/275
(58) Field of Search ............................. 34/275; 138/97; 362/369, 390, 234, 287, 427, 285, 418, 263, 264, 249, 259, 238, 239

(56) References Cited

U.S. PATENT DOCUMENTS 3,123,101 A    3/1964  Blount et al.
3,984,726 A *  10/1976 Ramler ........................ 315/154
4,141,060 A *  2/1979  Lackore et al. .............. 362/232
4,535,549 A *  8/1985  LaLa et al. ....................... 34/4
4,578,880 A *  4/1986  Motev ........................... 34/105
5,135,686 A *  8/1992  Masuhara et al. ............. 264/22
5,211,558 A *  5/1993  Bailey et al. .................. 433/77

FOREIGN PATENT DOCUMENTS

CH       676 493      1/1991
DE       42 05 113    4/1993
DE       42 06 035    4/1993
EP       0 122 246    10/1984
WO       92 16784     10/1992

* cited by examiner

Primary Examiner—Thomas M. Sember
(74) Attorney, Agent, or Firm—Collard & Roe, P.C.

(57) ABSTRACT

The radiation source is provided with the lamps 3 for irradiating the inner walls 2 of the long hollow cavities 1 with continuous movement of the radiation along the axis 4 of the cavity 1, in particular for curing radiation-curable synthetic-resin laminates in conjunction with the restoration of pipes and sewer ducts by means of UV-radiation, comprising a chassis having a plurality of lamps 3 arranged on its circumference, whereby the chassis has a central support extending in the direction of the axis, the support being supported by means of the guide wheels 5, 6 on the inner wall 2 of the cavity 1 on the shock-absorbing struts 7. The chassis has an axial, centrally arranged threaded spindle 8, and the guide wheel 5, 6 are mounted with a lamp 33 and the temperature sensors 9 on a chassis frame, whereby the one end of the shock-absorbing strut 7 is pivot-mounted on the guide wheel 5, 6, and the other end on a receiving block 11 running on the threaded spindle 8.

7 Claims, 3 Drawing Sheets

RADIATION SOURCE FOR IRRADIATING THE INNER WALLS OF LONG HOLLOW CAVITIES

CROSS REFERENCE TO RELATED APPLICATIONS

Applicants claim priority under 35 U.S.C. §119 of German Application No. 298 12 835.7, filed Jul. 18, 1998. Applicants also claim priority under 35 U.S.C. §120 of PCT/EP99/04211, filed Jun. 17, 1999. The international application under PCT article 21(2) was not published in English.

The invention relates to a radiation source with lamps for irradiating the inner walls of long hollow cavities with continuous movement of the radiation along the axis of the cavity, particularly for curing radiation-curable synthetic resin laminates during the internal restoration of pipes and sewer ducts by means of UV radiation, comprising a chassis having a plurality of lamps arranged on its circumference, whereby the chassis has a central support extending in the direction of the axis, said support being supported on shock absorbing struts against the inner wall of the cavity by means of guide wheels.

A radiation source with said features is known (DE 4205113 C1). In conjunction with said know radiation source, the guide wheels are pivot-mounted on guide rods on the central support extending in the axial direction, whereby perpendicular to said guide rods, the guide wheels are supported on a spring leg or shock absorber. A guide wheel is associated with each lamp plane.

Said known design has the drawback that no simple adaptation to different diameters of the cavity or diameters of the pipeline is possible. Different parts, specifically the support rollers with their bearing blocks rather have to be exchanged and replaced by driving elements permitting a larger or smaller radial spacing between the support and the pipeline. Only one running wheel with a shock absorber is associated with each lamp plane, so that uneven spots on the inner walls of the pipeline are not compensated.

The invention is based on the problem of designing a radiation source of the type specified above in such a way that adaptation of the device to different pipeline diameters is effected by a simple adjustment process without replacing structural components.

Said problem is solved according to the invention in that the chassis has a axial, centrally arranged threaded spindle, and that the guide wheels with a lamp and temperature sensors are mounted on a chassis frame, whereby the one end of the shock-absorbing strut is pivot-mounted on the guide wheel, and the other end on a receiving block running on the threaded spindle.

The dependent claims contain advantageous further developments of the invention.

The invention particularly offers the advantage of variable adaptation of the lamps and wheel spacings in relation to the inner wall of the synthetic resin laminate to be cured, via a central threaded spindle drive that can be operated by hand or electrically. Uneven spots on the surface of the laminate can be easily compensated by using two guide wheels in one lamp plane. In this way, each lamp is tied to the spacing of the laminate as well. Also, two or more equally structured chassis units or lamps per unit can be advantageously arranged one after the other. Each unit comprises a plurality, for example six chassis frames each having one or two lamps, which are offset against each other in the axial direction but preferably arranged at the same level.

By virtue of the embodiment of the radiation source as defined by the invention it is possible to restore with one device pipelines with different nominal diameters, for example of from 200 to 800 mm, in particular from 300 to 550 mm without complicated manipulations.

In conjunction with the arrangement of two or more units or lamps per unit in tandem, the unit located in front in the pulling direction and having a mounted variable number of UVA-lamps is operated with an electrical intensity lower than its rated load. Shifting of the spectrum due to the reduction in intensity is nonexistent. In particular, this has the advantage that the polymerization of the resin and thus the linking of the free molecules takes place at a slightly lower rate, and that the full output is radiated onto the laminate only by the second, directly trailing unit.

The invention is explained in greater detail in the following with the help of an exemplified embodiment shown in the drawing, in which.

Figure 1:
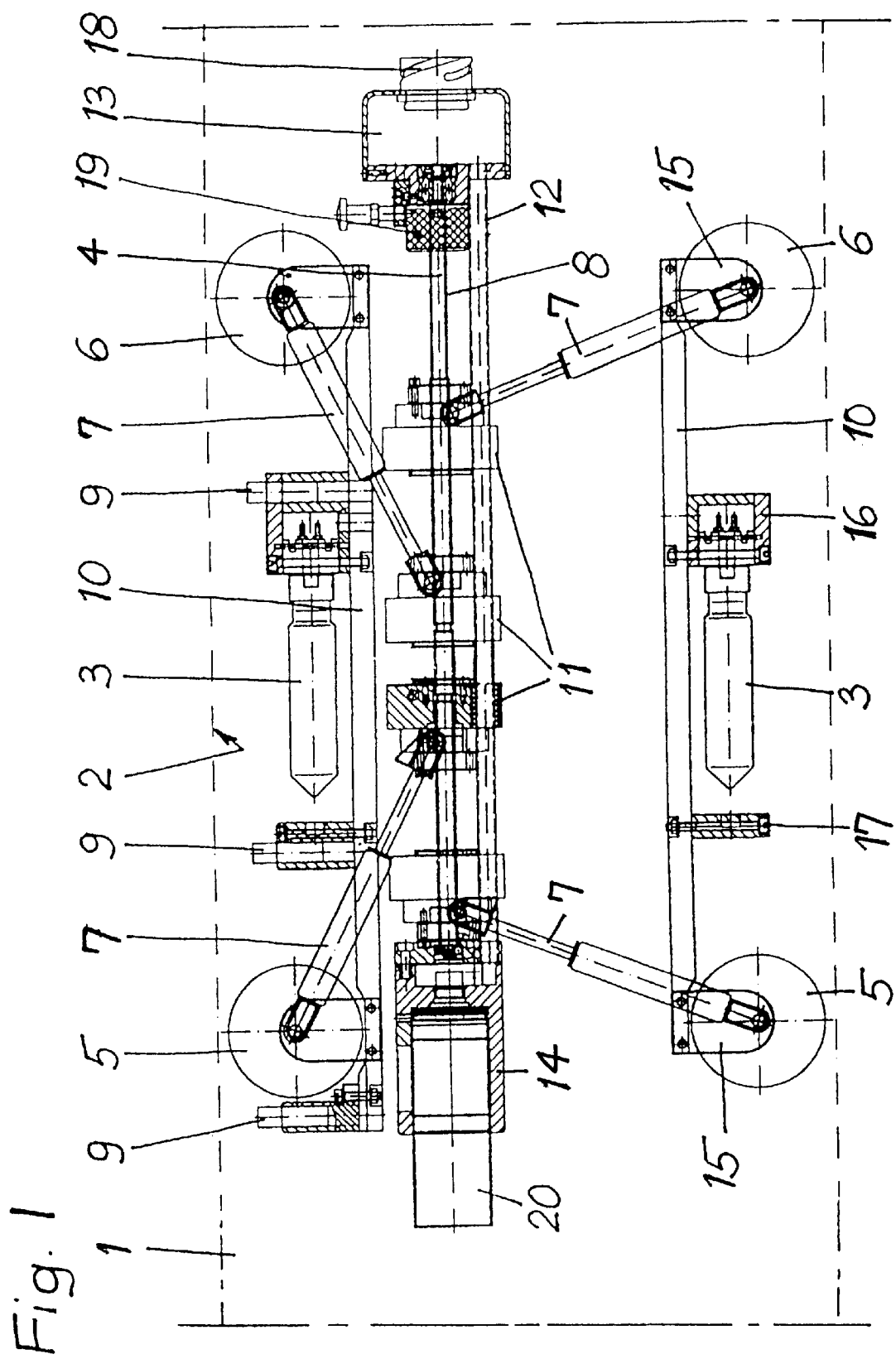
FIG. 1 shows a longitudinal section through the radiation source, with a unit with one lamp per support.

The radiation source shown in the drawing particularly serves for internally restoring pipelines and sewer ducts and is fitted with the UV-lamps 3. In the drawing, the pipeline is denoted as the cavity 1 whose inner wall 2 is to be restored by curing a resin-impregnated fiber hose applied to said inner wall.

A threaded spindle 8 coincides with the longitudinal axis 4 of the cavity 1, said threaded spindle being supported on both sides in the bearing blocks 13 and 14, respectively. The centering support of the threaded spindle 8 takes place with the help of the individual chassis frames 10 extending parallel with the axis 4. Said chassis frames 10 support on both sides the blocks 15, with the spring legs or shock absorbers 10 being pivot-mounted on said blocks. The other ends of said shock absorbers 7 each are pivot-mounted on a receiving block 11, which is mounted on the threaded spindle 8 and can be displaced perpendicular to the longitudinal axis by turning the threaded spindle 8. In each position, the shock absorber 7 and the threaded spindle jointly enclose an acute angle, whereby two adjacent shock absorbers 7 are directed away from each other outwards.

Each chassis frame 10 has a UVA-lamp 3 between the two guide wheels 5 and 6. Said lamp is arranged in a socket 16 and has a counter holding means 17. The lamps 3 shown in FIG. 1 can be mounted axially in relation to the expanse of the pipe not only in purely the longitudinal direction, but also at an angle of up to 45° in relation to the axial direction. This offers enhanced exploitation of the radiating surface of the lamp. Furthermore, to the extent to which this is required for controlling the speed at which the radiation source is pulled through the pipeline, the temperature sensors 9 are arranged on the chassis frame 10. The individual shock absorbers 7 extend radially within the cavity 1 or pipeline to be restored. One shock absorber 7 per guide wheel 5 and 6 suffices, as a rule, for swiveling the chassis frame 10; however, such shock absorbers 7 may be arranged also on both sides of the guide wheel.

Figure 2:
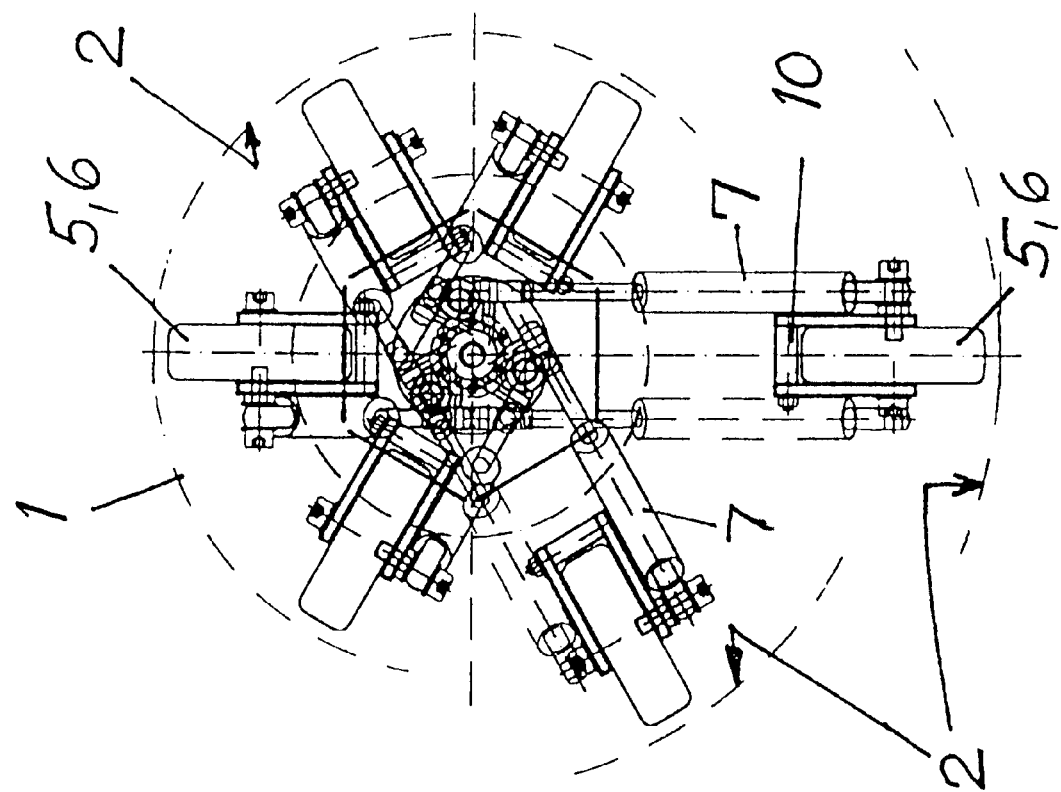
FIG. 2 shows a side view of FIG. 1.

FIG. 2 shows that provision is made for six of such chassis frames on one chassis unit; however, four or also eight frames may be provided depending on the diameter of the pipe. With each chassis frame 10, the individual lamps 3 are located between the laterally arranged shock absorbers 7.

FIG. 1 shows two positions of the shock absorbers 7, specifically in the upper half of the drawing for a smaller diameter, and for a larger diameter according to the lower half of the drawing. Starting from its center, the threaded spindle 8 has an oppositely directed thread, so that the respective receiving blocks are displaced in the opposite direction when the threaded spindle 8 is turned. An axial shaft 12 extending parallel with the threaded spindle 8 and supported on the bearing blocks 13, 14 serves for guiding the receiving blocks 11. The threaded spindle 8 can be turned with the help of a knurled nut 19; however, it may be driven with the help of an electric motor as well. A connection bush 18 for the electronics is located on the one bearing block 13, and a camera 20 may be arranged on the opposite side on the bearing block 14.

Figure 3:
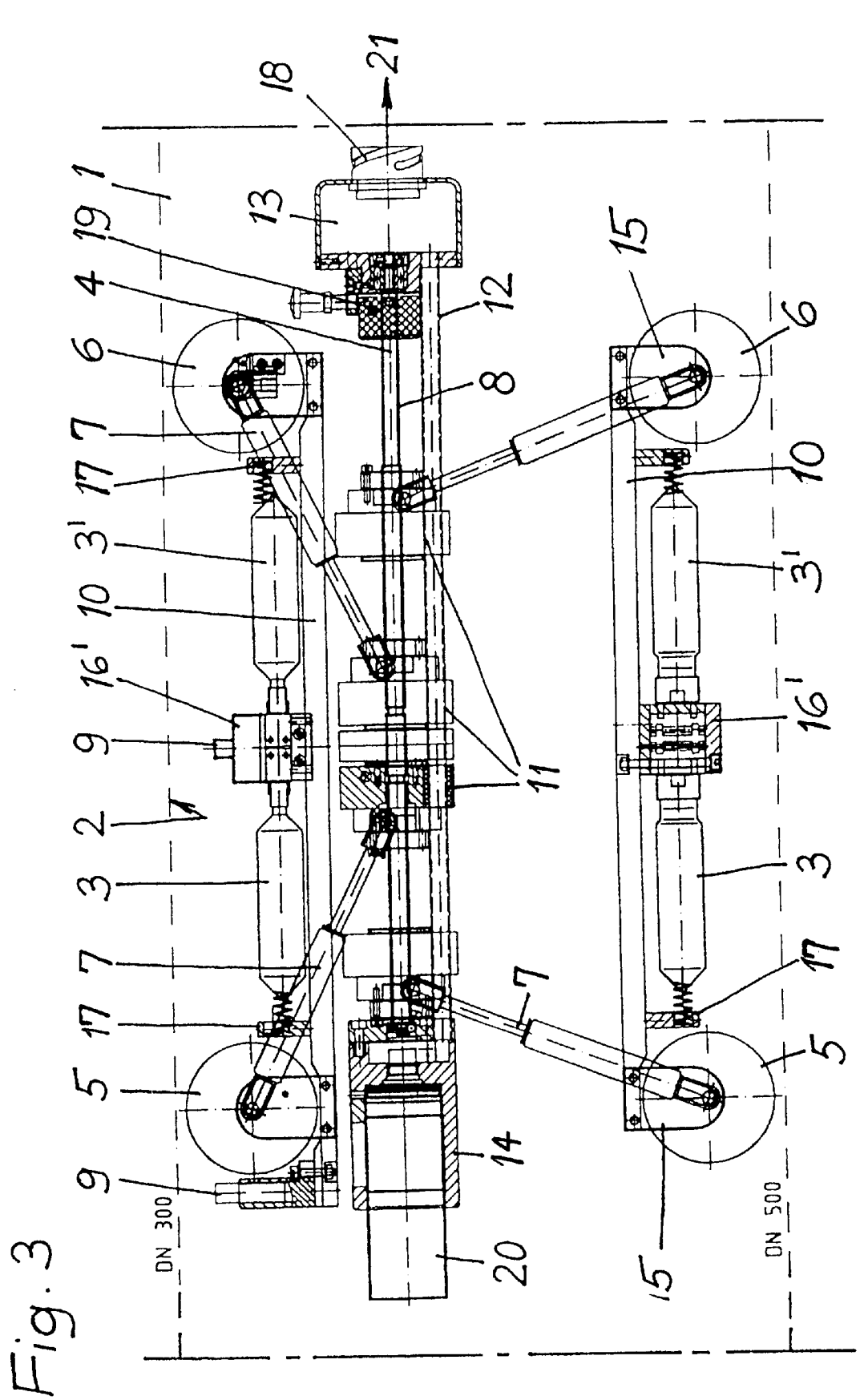
FIG. 3 shows a longitudinal section through the radiation source according to another embodiment, with a unit with two lamps per support.

In the embodiment of the radiation source shown in FIG. 3, each chassis frame 10 is provided with an additional lamp 3', so that two of such lamps 3 and 3' are located lined up between two guide wheels 5, 6. Each lamp 3, 3' has a counter holding means 17. Furthermore, the lamps 3, 3' have a common socket 16' and point from said central socket 16' in opposite directions. In particular, this offers the advantage that the lamp 3' located in front in the pulling direction 21 can be operated with another intensity or spectrum than the trailing lamp 3 in order to enhance the polymerization process.

What is claimed is:

1. A radiation source with lamps (3) for irradiating the inner walls (2) of long hollow cavities (1) with continuous movement of the radiation along the axis (4) of the cavity (1), in particular for curing radiation-curable synthetic resin laminates during the internal restoration of pipes and sewer ducts by means of UV-radiation, comprising a chassis having a plurality of lamps (3) arranged over its circumference, whereby the chassis has a central support extending in the axial direction, said support being supported by means of guide wheels (5, 6) on the inner wall (2) of the cavity (1) on shock-absorbing struts (7), characterized in that the chassis has an axial, centrally arranged threaded spindle (8), and that the guide wheels (5, 6) with a lamp (3) and temperature sensors (9) are mounted on a chassis frame (10), whereby the one end of the shock absorbing strut (7) is pivot-mounted on the guide wheel (5, 6), and the other end on a receiving block (11) running on the threaded spindle (8).

2. The radiation source according to claim 1, characterized in that a number of chassis frames (10) with guide wheels (5, 6) are arranged radially in relation to the threaded spindle (8).

3. The radiation source according to claim 1, characterized in that each chassis frame (10) has two guide wheels (5, 6) supported on shock-absorbing struts (7).

4. The radiation source according to claim 1, characterized in that a guide shaft (12) is arranged parallel with the threaded spindle (8), with the receiving blocks (11) being guided on said shaft.

5. The radiation source according to claim 1, characterized in that each chassis frame (10) has an additional lamp (3').

6. The radiation source according to claim 5, characterized in that the additional lamp (3') is arranged on a common socket (16') with the first lamp (3).

7. The radiation source according to claim 1, characterized in that the lamps (3, 3') are arranged in the axial direction between two guide wheels (5, 6) as well as between two shock absorbers (7) of a guide wheel (5 and 6, respectively) of each chassis frame (10).

\* \* \* \* \*